(12) United States Patent
Kemp

(10) Patent No.: US 7,356,467 B2
(45) Date of Patent: Apr. 8, 2008

(54) METHOD FOR PROCESSING RECOGNIZED SPEECH USING AN ITERATIVE PROCESS

(75) Inventor: Thomas Kemp, Esslingen (DE)

(73) Assignee: Sony Deutschland GmbH, Koeln (DE)

(*) Notice: Subject to any disclaimer, the term of this patent is extended or adjusted under 35 U.S.C. 154(b) by 734 days.

(21) Appl. No.: 10/830,835

(22) Filed: Apr. 23, 2004

(65) Prior Publication Data
US 2004/0215455 A1 Oct. 28, 2004

(30) Foreign Application Priority Data
Apr. 25, 2003 (EP) .................................. 03009419

(51) Int. Cl.
*G10L 15/06* (2006.01)
(52) U.S. Cl. ..................................... 704/252
(58) Field of Classification Search ................. 704/252
See application file for complete search history.

(56) References Cited
U.S. PATENT DOCUMENTS

| 5,710,864 A * | 1/1998 | Juang et al. ................. 704/238 |
| 7,165,031 B2 * | 1/2007 | Rees ........................... 704/252 |
| 2002/0002459 A1 | 1/2002 | Lewis et al. |

FOREIGN PATENT DOCUMENTS

WO   WO 03/038808   5/2003

OTHER PUBLICATIONS

"Proofreadinging Aid for Speech Dictation Systems" IBM Technical Disclosure Bulletin, IBM Corp. New York, US, vol. 39, No. 1, 1996, p. 149, XP000556355.

* cited by examiner

*Primary Examiner*—Susan McFadden
(74) *Attorney, Agent, or Firm*—Oblon, Spivak, McClelland, Maier & Neustadt, P.C.

(57) ABSTRACT

For processing recognized speech a method is proposed, which comprises the steps of receiving and/or generating (S0) recognized speech data (RSD), determining and/or generating (S1) a current measure of confidence (CMOC) for at least possibly erroneously recognized words of or within said recognized speech data (RSD), wherein an iterative process is performed comprising the following steps to be performed consecutively until a stopping condition (S3) is met:
  indicating/marking (S2, S5-B) at least some of said possibly erroneously recognized words as current indicated/marked errors (CIME) using said current measure of confidence (CMOC),
  receiving (S4) selection/correction data (SCD) being descriptive for a selection/correction with respect to said current indicated/marked errors (CIME),
  determining (S5) and/or generating an improved measure of confidence (IMOC) at least for further or remaining possibly erroneously recognized words of or within said recognized speech data (RSD).

If the stopping condition is met, an improved recognition result (IRR) is output (S8).

11 Claims, 4 Drawing Sheets

|  | A | B | C | D | RER |
|---|---|---|---|---|---|
| CMOC | 85.0 % | 99.99 % | 40.0 % | 92.0 % | 10.0 % |
| IMOC (1. Iteration) | 80.0 % | 99.97 % | 0 % | 90.0 % | 7.0 % |
| IMOC (2. Iteration) | 70.0 % | 99.0 % | 0 % | 85.0 % | 2.5 % |

Fig. 4

METHOD FOR PROCESSING RECOGNIZED SPEECH USING AN ITERATIVE PROCESS

The invention relates to a method for processing recognized speech.

Automatic speech recognition (ASR) has so far not been able to substantially increase the productivity in text document creation, in particular using dictation systems. The main reason for this is the fact that in automatic speech recognition errors are produced, which have to be corrected manually in the finished dictated document. The process of correction is a time consuming process that consumes most of the time that can be saved when speaking a document instead of typing it.

Dictation systems based on automatic speech recognition (ASR) are already commercially available on the market for quite some time. They can achieve word error rates of 10 to 5% and below.

For correction of the remaining errors confidence measures or measures of confidence were proposed. Thereby, potential recognition errors are determined by applying a measure of confidence and using a threshold. Potential recognition errors with a measure of confidence below the threshold are highlighted, and the user can navigate using two keys, i.e. forward and backward, between the highlighted words and correct them as necessary.

However, highlighting the potential recognition errors as proposed did not substantially help to speed up the process of text correction.

It is an object of the invention to provide a method for processing recognized speech, which enables a reduction of the time required for correcting recognized speech.

To achieve this object, the invention provides a method according to claim 1. In addition, the invention provides a speech processing system, a computer program product, and a computer-readable storage medium as defined in claims 8, 9, and 10, respectively. Further features and preferred embodiments are respectively defined in respective sub claims and/or in the following description.

The Method for processing recognized speech according to the invention, comprises the steps of
receiving and/or generating recognized speech data,
determining and/or generating a current measure of confidence for at least possibly erroneously recognized words of or within said recognized speech data,
wherein an iterative process is performed comprising the following steps to be performed consecutively until a stopping condition is met:
indicating/marking at least some of said possibly erroneously recognized words as current indicated/ marked errors using said current measure of confidence,
receiving selection/correction data being descriptive for a selection/correction with respect to said current indicated/marked errors,
determining and/or generating an improved measure of confidence at least for further or remaining possibly erroneously recognized words of or within said recognized speech data,
outputting an improved recognition result, in particular if said stopping condition is met.

Accordingly, a main idea of the invention is to present, i. e. indicate/mark possibly erroneously recognized words to a user, who has dictated a document, and let the user inspect these indicated/marked words. He may correct a respective word, or he may not correct it. In either case a respective word is of a known correct/incorrect status after the correction, which is valuable information for determining an improved measure of confidence. In other words, in each iteration the measure of confidence values, i. e. the improved measure of confidence values gets more accurate from iteration to iteration. Therefore, a user needs to correct much fewer words than in prior art and therefore also needs much less time in order to correct the dictated document.

Preferably, additional to said indicated/marked at least part of said possibly erroneously recognized words surrounding words are marked/indicated as currently indicated/ marked errors. This means that it is also possible that words get marked which are not necessarily erroneously. However, it can be advantageous to also mark surrounding words, as it may be more convenient for a user to read e. g. a whole sentence and correct a whole sentence.

Preferably for indicating/marking said current indicated/ marked errors, a threshold is determined and only possibly erroneously recognized words are marked for which said current measure of confidence ranges below said threshold. This way the number of words which get marked can be influenced and may be kept low.

It is an advantage to determine said threshold such that in each iteration a fixed percentage of all words of said recognized speech data are indicated/marked. This is extremely easy from an implementation point of view.

In a preferred embodiment, said current measure of confidence is determined using a first regressor, in particular a neural network, which first regressor is trained using the following features: Acoustic score, speaking rate estimate, local signal to noise ratio and/or other standard features generally used to determine the measure of confidence. In other words, the current measure of confidence is determined using standard features generally used to estimate a current measure of confidence.

Preferably, said new improved measure of confidence is determined using a second regressor, in particular a neural network, which second regressor is trained using features derived from said selection/correction data. Using a neural network as second regressor has the advantage that new features can be easily incorporated.

It is possible that said first regressor and said second regressor are identical, wherein when using said first regressor for determining said current measure of confidence the features related to said selection/correction data are not used as input for said first regressor.

Said iterative process may be stopped if the percentage of current indicated/marked errors of all words of said recognized speech data is lower than a predetermined accept rate.

Further, the iterative process may be stopped if an estimated residual word error rate ranges below a predetermined word error accept rate, wherein the estimated residual word error rate is determined in each iteration with respect to the entire document. It should be noted, that the estimated residual word error rate gets more accurate from iteration to iteration. This is because the improved measure of confidence values get also more accurate from iteration to iteration, and these improved measure of confidence values are used to estimate the residual word error rate.

A Speech processing system according to the invention is capable of performing or realizing a method for processing recognized speech as defined above and/or the steps thereof.

A Computer program product according to the invention, comprises a computer program means adapted to perform and/or to realize the method of processing recognized speech and/or the steps thereof, when it is executed on a computer, a digital signal processing means, and/or the like.

A Computer readable storage medium according to the invention, comprises a computer program product as defined above.

The invention and advantageous details thereof will be explained by way of an exemplary embodiment thereof in the following with reference to the accompanying drawings in which FIG. 1 is a block diagram showing the main steps according to the invention;

FIG. 4 shows a table with measure of confidence values for different iterations.

Figure 1:
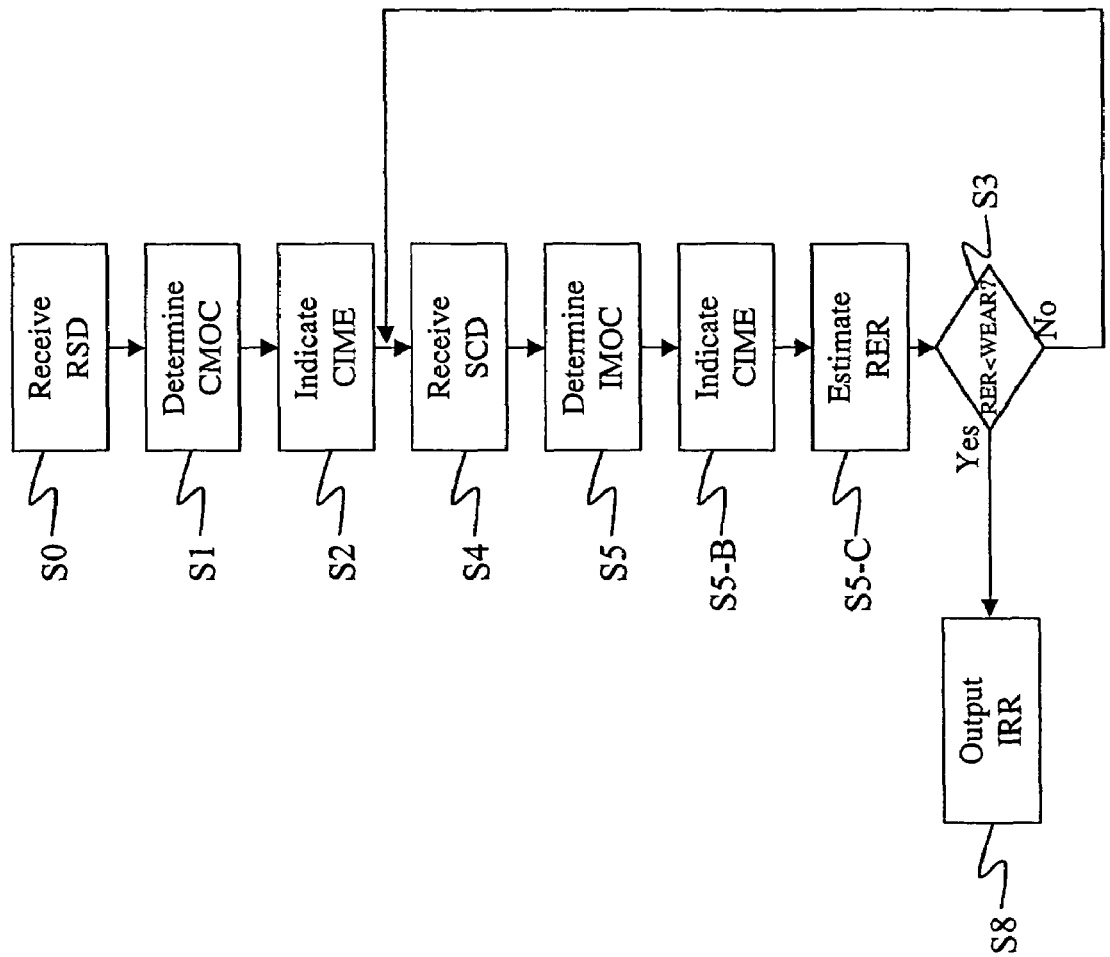

In FIG. 1, in a first receiving step S0, recognized speech data RSD is received. In the following first determining step S1 a current measure of confidence CMOC is determined.

An estimator to estimate a measure of confidence MOC works by computing a set of features for each word of the hypothesis. Features include e.g. an acoustic score, speaking rate estimate, and local signal-to-noise ratio. The features are combined into a final confidence value, i.e. said current measure of confidence CMOC, by means of a first regressor, for example a neural network like a multilayer perceptron network. The output is then a number, i.e. a measure of confidence, in the range from 0 to 1, whereby 0 indicates no confidence at all and 1 indicates full confidence.

In the first determining step S1, the current measure of confidence CMOC is determined for all words of the recognized speech data RSD. In a following indicating step S2, the current measure of confidence CMOC is used for indicating/marking some of the recognized words.

Figure 2:
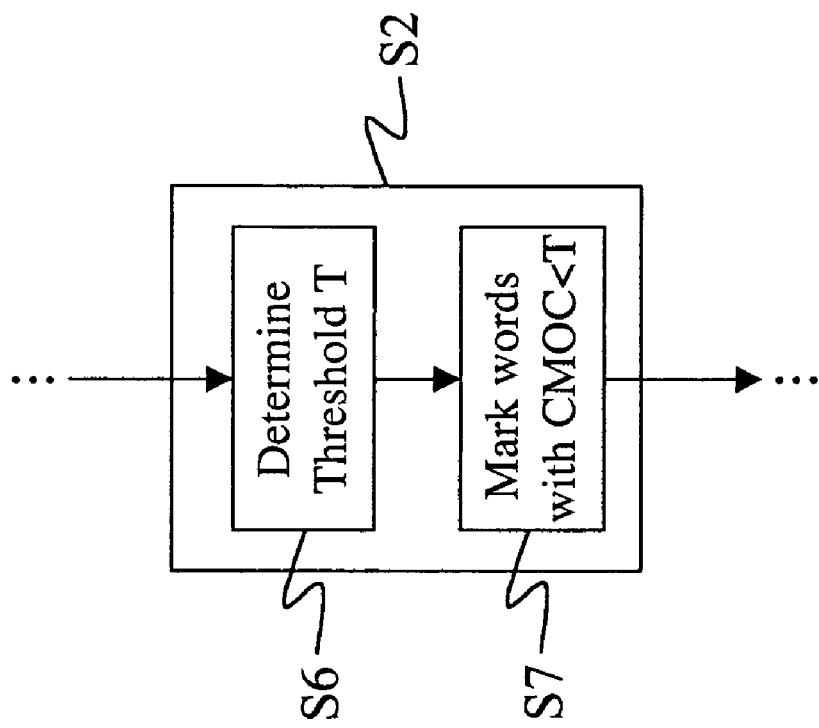
FIG. 2 is a block diagram showing the steps performed in order to indicate possibly erroneously recognized words.

A possible embodiment for indicating/marking some of the recognized words is shown in FIG. 2. Thereby, a threshold T is determined in a threshold determining step S6. In a marking step S7, only words, in the following referred to as marked words or current indicated/marked errors CIME, are marked, for which the current measure of confidence CMOC ranges below the threshold T. The threshold is determined in each iteration such that always a fixed percentage of all words in the document get indicated/marked. As fixed percentage a typical value may be 0.5% of all words. By thresholding the output of a regressor, the regressor is turned into a classifier.

After the indicating step S2, an iterative process is started. The iterative process is comprised of a second receiving step S4, a second determining step S5, a second indicating step S5-B, a residual word error rate estimating step RER, and a stopping step S3.

In the second receiving step S4 selection/correction data SCD is received. The selection/correction data SCD contains information about user corrections. This means that the current indicated/marked errors CIME are displayed, i.e. highlighted, to the user, and the user corrects the respective words, i.e. the current indicated/marked errors CIME. It should be noted at this point, that above-mentioned threshold T is chosen such that only few words get marked in comparison to prior art. This way, the user only has to correct few words, which leads to a fast correction process.

It should also be mentioned, that it is possible that in the indicating step S2, additionally to the words marked by way of using said threshold, words may get indicated/marked that are surrounding words to these words. In other words, the marked words may comprise words which are marked, because their current measure of confidence CMOC ranges below said threshold, and surrounding words. The surrounding words may be chosen, such that a whole sentence gets marked. This can be an advantage, because a user may prefer to read an entire sentence and correct it entirely, instead of just isolated words.

The received selection/correction data SCD is now used in the second determining step S5 to determine, i.e., compute, an improved measure of confidence IMOC. For computing the improved measure of confidence IMOC, a second regressor R-IMOC, e.g. a neural network, is used. However, this time in addition to the above-mentioned features, i.e. e.g. acoustic features, features containing information derived from the received selection/correction data SCD are used, i.e. contextual reference-quality information.

As mentioned, the received selection/correction data SCD contains information from the user's corrections. During the correction process, the user inspects all marked, i.e. highlighted words. This means, that after the correction process, all words that were marked, i.e. the current indicated/marked errors CIME, are of a known correct/incorrect status; for words that have not been corrected by the user, it is now known securely that the word was correct before (correct status), and for words that have been corrected by the user, it is now known securely that the word was incorrect before (incorrect status). In other words, the user corrected all actual recognition errors that were marked, and did not change the incorrectly spotted recognition errors. This means, as mentioned, that the highlighted words are, after user correction, all of a known correct/incorrect status. This information is no longer insecure, but it is reference information. Using this information as additional feature in the second classifier R-IMOC, the measure of confidence MOC can be determined much more accurately.

It should be noted at this point, that the first regressor for estimating said current measure of confidence CMOC, and the second regressor R-IMOC may be identical. If this is the case, then the features relating to the selection/correction data (SCD) are not used as input for the first regressor.

The second regressor R-IMOC (regressor, e.g., neural network) is trained to utilize information from selection/correction data SCD where this information is available. Training can be done in the usual way incorporating the correct/false information for neighbors. Its performance can be substantially increased in the vicinity, i.e., at least the language model span—typically three words, of the corrected words. In other words, the improved measure of confidence IMOC can be estimated much more accurately, because for the previously highlighted words, the correct/incorrect status of a word is known and this information is very valuable.

Figure 3:
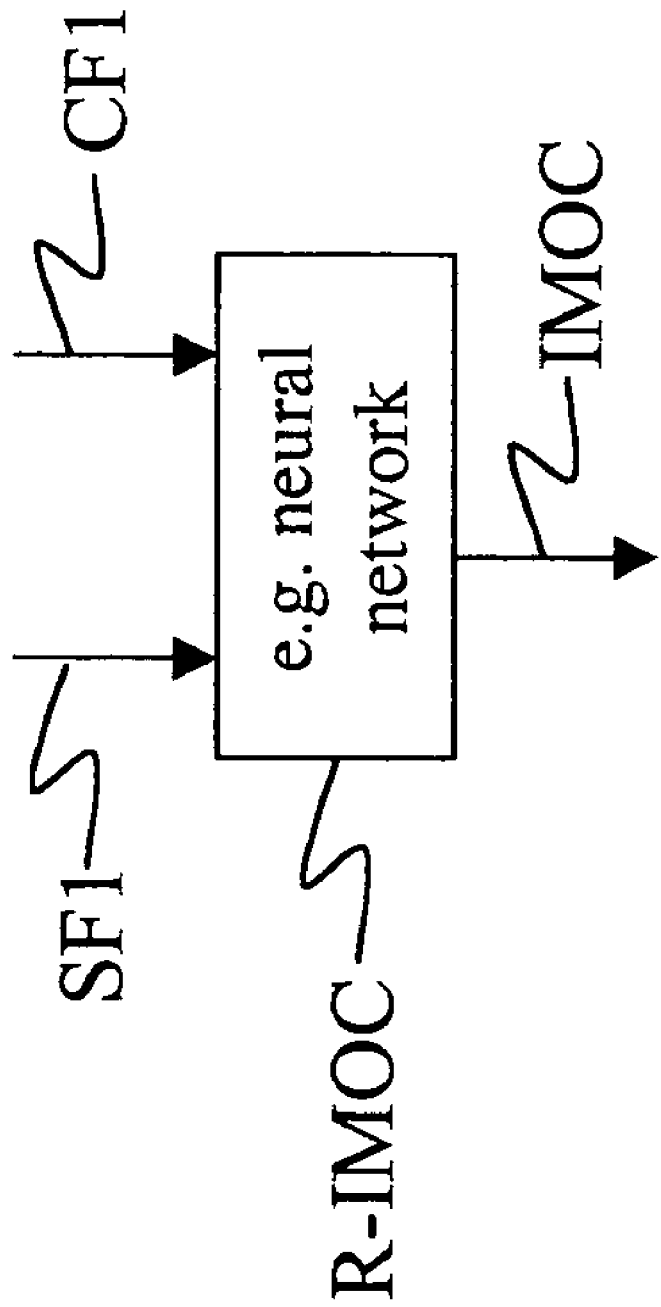
FIG. 3 shows a first regressor used to determine an improved measure of confidence.

FIG. 3 depicts the determining of the improved measure of confidence IMOC. As can be seen the second regressor R-IMOC, e.g. a neural network, is used to determine the improved measure of confidence IMOC. As input for the first regressor R1 a first standard feature set SF1 is used, which contains the above-mentioned standard features for determining a measure of confidence MOC, i.e. for example acoustic score, speaking rate estimate, and local signal-to-noise-ratio. As further input a first correction feature set CF1 is used. This first correction feature set CF1 includes features derived from the user's corrections, i.e. the received selection/correction data.

After the second determining step S5, follows a second indicating step S5-B. In this second indicating step, the improved measure of confidence IMOC is used to determine new current indicated/marked errors CIME. Therefore, as in the indicating step S2 a threshold is determined, such that the fixed percentage of all words in the document get indicated/marked.

Then follows an estimating step S5-C. In this estimating step S5-C a residual word error rate RER is determined. Therefore the improved measure of confidence IMOC is used.

Then follows a stopping step S3. If the estimated residual word error rate RER lies below a predetermined word error accept rate an outputting step S8 follows. In this outputting step S8 an improved recognotion result IRR is outputted. This can for example be a document which has been dictated.

If the stopping criterion in the stopping step S3 is not met, i. e. the estimated residual word error rate RER lies above the predetermined word error accept rate, a new iteration of the iterative process is started, i. e. it follows the second receiving step S4, the second determining step S5, the second indicating step S5-B, and the estimating step S5-C.

In FIG. 4 an example is given on how the improved measure of confidence IMOC gets more accurate in each iteration. In the example recognized speech data RSD has been received in the first receiving step S0, and the first determining step S1 has been performed yielding current measure of confidence values shown in the first row of the table in FIG. 4. In the table of FIG. 4 current measure of confidence CMOC values are displayed for four exemplary words, a first word A, a second word B, a third word C, and a fourth word D. It should be noted, that generally many more words exist, i. e. a large number of words, and that the table of FIG. 4 with only four words is only an example in order to explain the gist of the invention.

As noted above, these current measure of confidence values CMOC are determined by using the first regressor with input features such as e. g. acoustic score, speaking rate estimate, and local signal to noise ratio. The current measure of confidence values CMOC in the first row of the table in FIG. 4 can only be rather inaccurate estimations, because these current measure of confidence values CMOC are generally very speaker dependent, however, in the first determining step S1 when calculating these values no speaker information may be available. In other words, the current measure of confidence value of 40% for the third word C for example is only an estimate. It means that for an average speaker the probability that the third word C is not recognized correctly is 40%. However, for a speaker, that is currently using the system the current measure of confidence value CMOC for the third word C may be higher or lower. In the last column of the table in FIG. 4 residual word error rates RER are given. These residual word error rates RER are determined from the measure of confidence values.

In the example the residual word error rate RER is 10% for the current measure of confidence values in the first row.

Now, the indicating step S2 follows, i. e. a fixed percentage of all words contained in the document are marked, wherein the words with the lowest current measure of confidence values CMOC are marked. This is equivalent to determining a threshold T and only marking words with a current measure of confidence value CMOC below the threshold T. In the example of FIG. 4 the third word C gets marked. The user then corrects the marked words, which after the correction process have a known correct/incorrect status. In the example of FIG. 4 the user has corrected the third word C.

Now follows the second receiving step S4, in which the selection/correction data SCD are received, which correspond to the corrected words. This information is then used as input for the second determining step S5 together with the above-mentioned first standard feature set SF1, which contains the above-mentioned standard features for determining a measure of confidence MOC, i. e. for example acoustic score, speaking rate estimate, and local signal to noise ratio.

In the example the improved measure of confidence values IMOC are given in the second row of the table of FIG. 4 for the four example words. As can be seen, the values differ from the first row of the table. Since now user specific data is available, the improved measure of confidence values IMOC are much more accurate than the current measure of confidence values CMOC in the first row of the table in FIG. 4. As mentioned above, the third word C had been corrected by the user after the indicating step S2. Therefore, the improved measure of confidence value IMOC for this third word C is zero percent for the current and all following iterations, as can be seen in the table of FIG. 4.

Then follows the second indicating step S5-B, and the estimating step S5-C. In the estimating step S5-C, a residual word error rate RER is determined from the improved measure of confidence values IMOC in the second row of the table in FIG. 4. The residual word error rate RER is now 7%.

Then follows the stopping step S3. In the stopping step S3, it is checked, whether the residual word error rate RER lies below a predetermined word error accept rate WEAR. In the example, the word error accept rate WEAR is 3%. Since the residual word error rate RER is 7%, and therefore not below the word error accept rate WEAR which is 3%, a second iteration starts, i. e. it follows the second receiving step S4. In this second receiving step S4, again selection/correction data SCD is received, which corresponds to user corrections, and again for each word an improved measure of confidence value IMOC is determined in the second determining step S5. The improved measure of confidence values IMOC for this second iteration are given in the third column of the table in FIG. 4. As can be seen the improved measure of confidence values IMOC have again changed, and have become more accurate. From the improved measure of confidence values IMOC of the second iteration, again the residual word error rate RER is determined, which is equal to 2,5% in the example. Now follows the stopping step S3. Now the residual word error rate RER is smaller than the word error accept rate WEAR and therefore it follows the outputting step S8, i. e. the improved recognition result IRR is outputted.

In the following the invention is summarized:

The basic idea is that the user corrects the errors of a previously dictated document in multiple steps, where in each step only the most likely erroneous words, i.e. very few words, are presented to the user for correction or acceptance. Based on the manual corrections, the measure of confidence MOC is recomputed and the user performs a subsequent step of correction, and so forth until a correction showed no needed corrections ("good") or less than a predetermined percentage of needed corrections ("good enough"). This is a variation of the stopping criterion. If there are no errors among the most likely erroneous words, it is very probable that the recognition rate is good. If there are residual errors, the expected residual error rate can be computed and compared to a predetermined (by the user) value, to decide whether it is "good enough" for him.

Further aspects of the invention may be more clearly understood by the following elucidations:

Typically, a confidence measure estimator works by computing a set of features for each word of the hypothesis (features include acoustic score, speaking rate estimate, local signal-to-noise ratio, etc.) and then combining the features into a final confidence value by means of a regressor, e.g., a neural network like a multilayer perceptron. The output is then a number typically in the range from 0 to 1, 0 indicating no confidence at all and 1 indicating full confidence. A desired scaling is such that the number 0.5 indicates that 50% of the words tagged with 0.5 are wrong, and 50% are correctly recognized. If this is the case the bias B of 0.5 can be subtracted and the result can be doubled, so that the final output result is ranged between −1 and 1. The subtraction of the bias and the scaling is not mandatory. It is just for convenience. However, this is only true on the average over many speakers; it may very well be that for speaker A the output value that splits correct/false in a 50:50 proportion (referred to above as the "bias B") is not 0.5 but say 0.3, where for speaker B it is 0.7. It is not possible to tell the correct bias for an unknown speaker; any system has to use a predetermined bias for all speakers because of this uncertainty (and the predetermined bias is usually 0.5).

It is a fundamental property of combining independent features into a joint result that it is easily possible to add another input (a new feature) and get a better or at least unchanged classifier output result. This property is exploited in the proposed invention.

There seem to be indications that word errors occur consecutively—one incorrect word gives rise to another incorrect word and so forth. The probability of observing an incorrect word after an incorrect word is typically more than double the probability of observing an incorrect word after a correctly recognized word. However, it is not possible to tell for sure whether or not a word has been correctly recognized or not. A confidence measure typically already uses this type of contextual information, but since the information is unsafe, the benefit from it is quite limited.

It is the purpose of the proposed invention to cut down the time required for text correction. In the process of text correction using MOC-guided selective highlighting of potential errors, the bulk of the time is spent in inspecting words, which are not really recognition errors. Therefore, a measure to reduce this number, or equivalently to improve the quality of the confidence measure, is needed in order to solve the problem.

This is basically done by a multiple iteration approach where each iteration can be done in a very short time and provides information for the next iteration. This information is used to improve the confidence measure. With the new improved MOC the highlighting is recomputed and the user goes over the document again. The process is repeated until the document error rate is low enough for the application. In every iteration, only the very badly scoring words are highlighted, say the words with a confidence less than −0.7 after scaling. Compared to the approach in prior art, this results in a factor of around 100 less words to be corrected, of course, at the expense of not highlighting a large number of the actual errors. However, there is information available after the first round of correcting: The user corrected all actual recognition errors, and did not change the incorrectly spotted recognition errors. Also, the highlighted words of the first pass are, after user correction, all of known correct/incorrect status (and in the case of incorrect, the correct word is known). This information is no longer insecure but it is reference information. Hence, it can be used as additional feature in the MOC classifier itself. If the MOC classifier is trained to utilize such information where available—training can be done in the usual way with incorporating the correct/false information for neighbors—its performance can be substantially increased in the vicinity (at least the language span, typically 3 words) of the corrected words. Furthermore, the information from the first pass allows a re-estimation of the speaker dependent bias term (which is 0.5 by default), by comparing the expected amount of correct predictions in the first pass with the actual amount of correct predictions. The combination of the two effects, the modification of the bias term and the addition of strong verified features into the set of the MOC classifier, help to lower the MOC error rate and therefore to cut down the total correction time. After the first round of highlighting and correcting, the improved MOC is used to classify the words of the document again, using the new bias and the manually corrected anchor points. Again, the least confident words are highlighted and the second round of correction starts. Every round of correction it is estimated how many errors remain in the document. This is possible since the bias term is continuously adapted to match the true bias for this speaker, utilizing the information from all the correction iterations. After the estimated number or remaining errors is below a certain predefined threshold, the process terminates and the document is finished. The whole process is very time efficient as there is no need to retrain the MOC classifier during operation, and only one parameter (the bias) needs to be computed between any two iterations of correction.

REFERENCE SYMBOLS

A first word
B second word
C third word
CF1 first correction feature set
CIME current indicated/marked errors
CMOC current measure of confidence
D fourth word
IMOC improved measure of confidence
IRR improved recognition result
RER residual word error rate
R-IMOC second regressor
RSD recognized speech data
S0 first receiving step
S1 first determining step
S2 indicating step
S3 stopping step
S4 second receiving step
S5 second determining step
S5-B second indicating step
S5-C estimating step
S6 threshold determining step
S7 marking step
S8 outputting step
SCD selection/correction data
SF1 first standard feature set
T threshold

The invention claimed is:

1. A method for processing recognized speech, the method comprising:
   at least one of receiving and generating recognized speech data;
   at least one of determining and generating a current measure of confidence for at least possibly erroneously recognized words of or within said recognized speech data; and
   performing an iterative process consecutively until a stopping condition is met, the process including, indicating/marking at least a part of said possibly erroneously recognized words as current indicated/marked errors using said current measure of confidence, receiving selection/correction data being descriptive for a selection/correction with respect to said current indicated/marked errors, at least one of determining and generating an improved measure of confidence at least for further or remaining possibly erroneously recognized words of or within said recognized speech data, and outputting an improved recognition result, in particular if said stopping condition is met.

2. The method according to claim 1, wherein additionally to said indicated/marked at least part of said possibly erroneously recognized words surrounding words are marked/indicated as current indicated/marked errors.

3. The method according to claim 1, wherein for indicating/marking said current indicated/marked errors, a threshold is determined and only possibly erroneously recognized words are marked for which said current measure of confidence ranges below said threshold.

4. The method according to claim 3, wherein said threshold is determined such that in each iteration a fixed percentage of all words of said recognized speech data are indicated/marked.

5. The method according to claim 1, wherein said current measure of confidence is determined using a first regressor, in particular a neural network, which first regressor is trained using the following features: acoustic score, speaking rate estimate, local signal-to-noise ratio and/or other standard features generally used to determine a measure of confidence.

6. The method according to claim 1, wherein said new improved measure of confidence is determined using a second regressor, in particular a neural network, which second regressor is trained using features derived from said selection/correction data.

7. The method according to claim 1, wherein said first regressor and said second regressor are identical, wherein when using said first regressor for determining said current measure of confidence the features related to said selection/correction data are not used as input for said first regressor.

8. The method according to claim 1, wherein said iterative process is stopped, if the percentage of current indicated/marked errors of all words of said recognized speech data is lower than a predetermined accept rate.

9. The method according to claim 1, wherein within each iteration an estimated residual word error rate with respect to the entire document is determined, and the iterative process is stopped, if said estimated residual word error rate ranges below a predetermined word error accept rate.

10. A speech processing system, comprising:

a receiving or generating unit configured to receive or generate recognized speech data;

a determining or generating unit configured to determine or generate a current measure of confidence for at least possibly erroneously recognized words of or within said recognized speech data; and an iterative process performing unit configured to perform consecutively until a stopping condition is met, the iterative process performing unit including, an indicating/marking unit configured to mark at least a part of said possibly erroneously recognized words as current indicated/marked errors using said current measure of confidence, a receiving selection/correction data unit configured to receive selection/correction data being descriptive for a selection/correction with respect to said current indicated/marked errors, a determining or generating unit configured to determine or generate an improved measure of confidence at least for further or remaining possibly erroneously recognized words of or within said recognized speech data, and an outputting unit configured to output an improved recognition result, in particular if said stopping condition is met.

11. A computer readable medium encoded with a computer program configured to cause an information processing apparatus to execute a method, the method comprising:

at least one of receiving and generating recognized speech data;

at least one of determining and generating a current measure of confidence for at least possibly erroneously recognized words of or within said recognized speech data, performing an iterative process consecutively until a stopping condition is met, including indicating/marking at least a part of said possibly erroneously recognized words as current indicated/marked errors using said current measure of confidence, receiving selection/correction data being descriptive for a selection/correction with respect to said current indicated/marked errors, at least one of determining and generating an improved measure of confidence at least for further or remaining possibly erroneously recognized words of or within said recognized speech data, and outputting an improved recognition result, in particular if said stopping condition is met.

* * * * *